(12) United States Patent
Nakane et al.

(10) Patent No.: US 8,439,443 B2
(45) Date of Patent: May 14, 2013

(54) VEHICLE SEAT

(75) Inventors: Ryoshu Nakane, Toyota (JP); Toshinao Wada, Miyoshi (JP); Kazuya Iwasa, Obu (JP)

(73) Assignees: Toyota Boshoku Kabushiki Kaisha, Aichi-Ken (JP); Toyota Jidosha Kabushiki Kaisha, Aichi-Ken (JP); Aisin Seiki Kabushiki Kaisha, Aichi-Ken (JP)

( * ) Notice: Subject to any disclaimer, the term of this patent is extended or adjusted under 35 U.S.C. 154(b) by 276 days.

(21) Appl. No.: 12/850,039

(22) Filed: Aug. 4, 2010

(65) Prior Publication Data
US 2011/0043020 A1 Feb. 24, 2011

(30) Foreign Application Priority Data
Aug. 21, 2009 (JP) ................................ 2009-192066

(51) Int. Cl.
*B60N 2/12* (2006.01)
(52) U.S. Cl.
USPC ..................... 297/378.12; 297/341
(58) Field of Classification Search .................. 297/334, 297/341, 331, 336
See application file for complete search history.

(56) References Cited

U.S. PATENT DOCUMENTS

| | | | |
|---|---|---|---|
| 3,931,995 A * | 1/1976 | Arai | 297/341 |
| 3,940,182 A | 2/1976 | Tamura | |
| 3,957,312 A * | 5/1976 | Bonnaud | 297/341 |
| 4,484,776 A * | 11/1984 | Gokimoto et al. | 296/65.09 |
| 4,606,577 A * | 8/1986 | Hirama et al. | 297/331 |
| 6,048,030 A * | 4/2000 | Kanda et al. | 297/341 |
| 6,478,358 B1 * | 11/2002 | Okazaki et al. | 296/65.09 |
| 6,793,285 B1 * | 9/2004 | Tame | 297/336 |
| 6,817,646 B2 * | 11/2004 | Kikuchi et al. | 296/65.05 |
| 6,827,404 B2 * | 12/2004 | Blair et al. | 297/378.12 |
| 6,883,854 B2 * | 4/2005 | Daniel | 296/65.03 |
| 2010/0032976 A1 | 2/2010 | Yamashita et al. | |

FOREIGN PATENT DOCUMENTS
JP 2002-67761 3/2002

* cited by examiner

*Primary Examiner* — David Dunn
*Assistant Examiner* — Timothy J Brindley
(74) *Attorney, Agent, or Firm* — Greenblum & Bernstein P.L.C.

(57) ABSTRACT

A vehicle seat includes an operating member that is provided for a seat back. The operating member is operated to release locking of a seat cushion to a floor and to release rotation-sopped state of a reclining device. By operating the operating member, a first link rotatably provided for the seat back is operated in one rotation direction to thereby turn a second link rotatably provided for a base frame so that locking of the seat cushion to the floor is released. When the seat back is tilted forward, the first link is moved together with the seat back in a direction to be separated from the second link, that is, in a direction opposite to a direction in which the first link turns the second link.

2 Claims, 10 Drawing Sheets

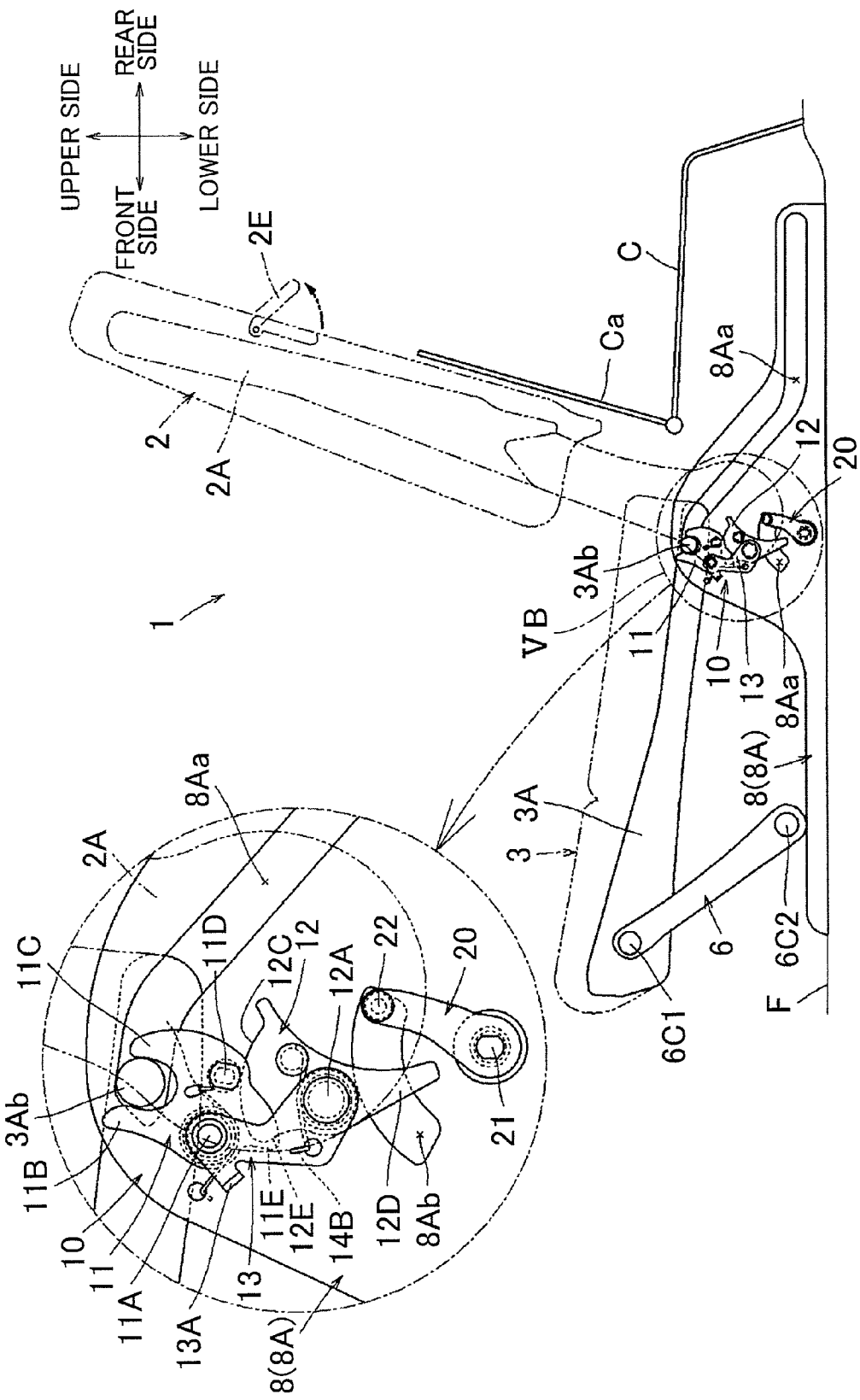
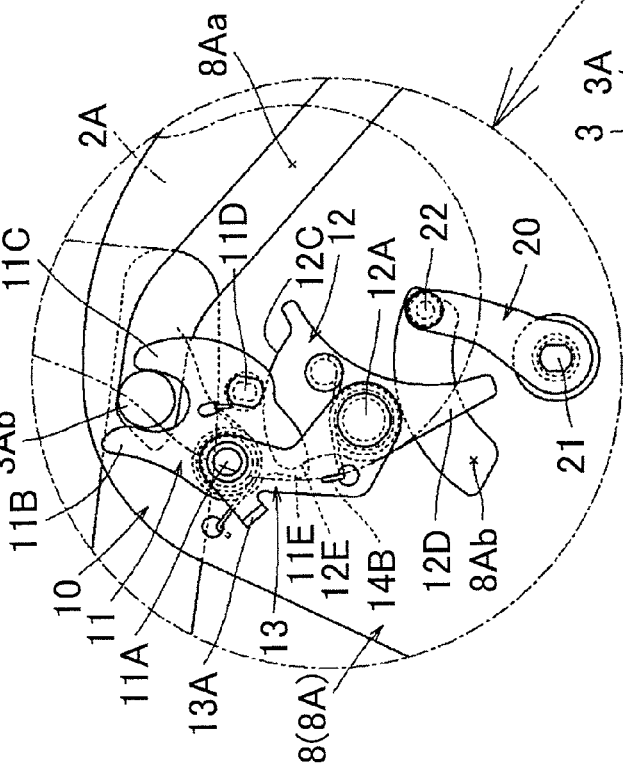

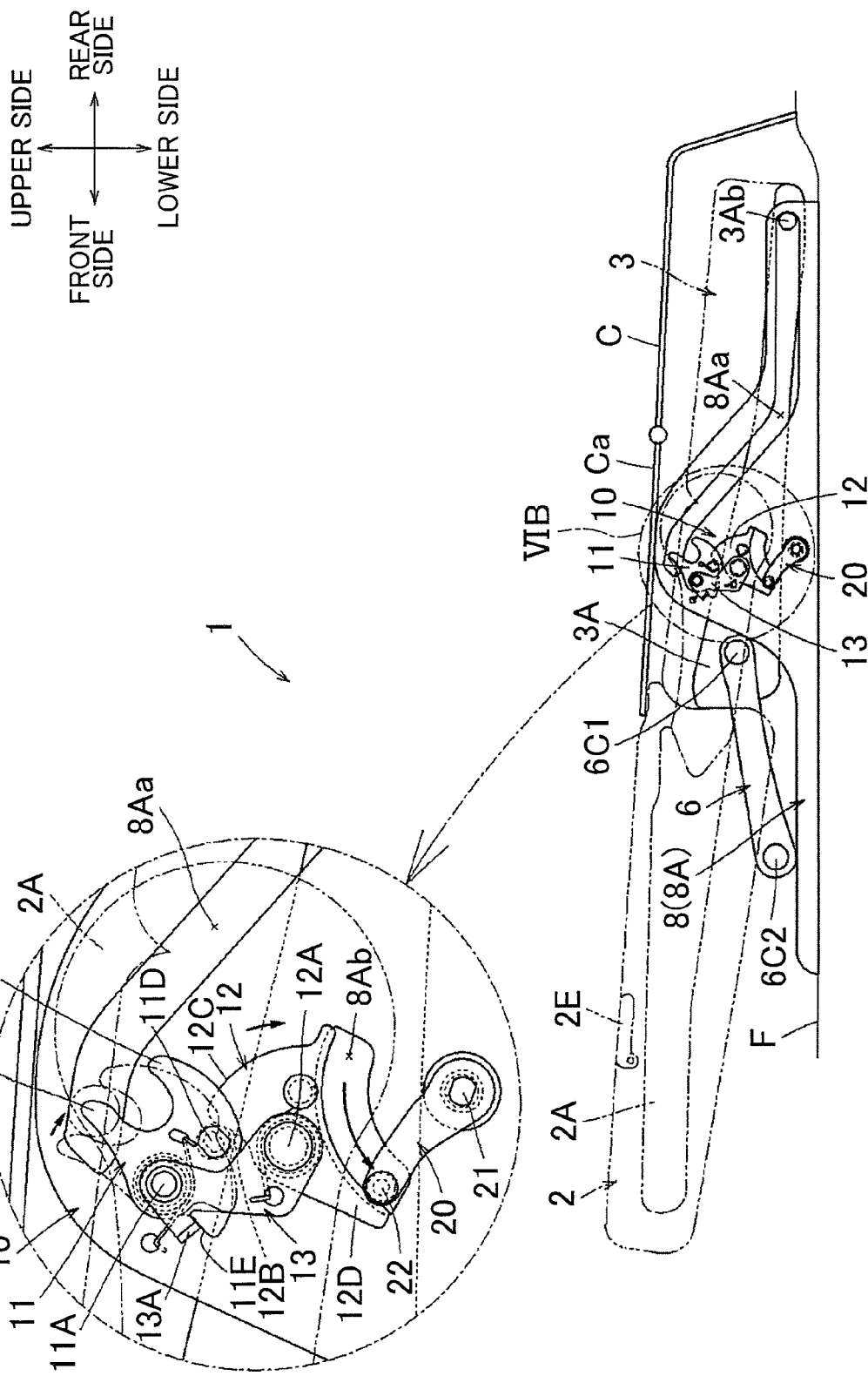

VEHICLE SEAT

INCORPORATION BY REFERENCE

The disclosure of Japanese Patent Application No. 2009-192066 filed on Aug. 21, 2009 including the specification, drawings and abstract is incorporated herein by reference in its entirety.

BACKGROUND OF THE INVENTION

1. Field of the Invention

The invention relates to a vehicle seat. More specifically, the invention relates to a vehicle seat that is configured so that an operating member is operated to release locking of a seat cushion to a floor.

2. Description of the Related Art

In an existing vehicle seat, there is known a mechanism that releases locking of a seat cushion to a floor by tilting a seat back forward to thereby allow the seat cushion to be shifted into a retracted position. Here, Japanese Patent Application Publication No. 2002-67761 (JP-A-2002-67761) describes a mechanism in which a seat back is tilted forward to cause a first link that rotates together with the seat back to turn a second link that releases the locking of a seat cushion to thereby release locking of the seat cushion to the floor.

In JP-A-2002-67761, the seat back may be tilted forward by a large amount, so the first link turns the second link and then passes over the second link. Thus, the arrangement of the first link and second link is inverted. Then, in JP-A-2002-67761, one of the first and second links has a relief structure such that the inverted arrangement of the first link and second link is returned to an original arrangement by returning the seat back from a folded position to an original position.

However, according to the above existing art, one of the first and second links needs to have a relief structure, so there is a problem that the size of the entire configuration increases.

SUMMARY OF THE INVENTION

The invention provides a vehicle seat that has a mechanism for releasing locking of a seat cushion to a floor by operating an operating member provided for a seat back so as not to invert the arrangement of a plurality of link mechanisms even when the seat back is tilted forward without an increase in size and complexity of the configuration.

A first aspect of the invention provides a vehicle seat. The vehicle seat includes an operating member that is provided for a seat back, wherein the operating member is operated to release locking of a seat cushion to a floor and to release rotation-stopped state of a reclining device. The vehicle seat includes a first link that is pivotally provided for the seat back and a second link that is pivotally provided for the seat cushion or the floor. The first link is operated in one direction by operating the operating member to thereby turn the second link. Thus, locking of the seat cushion to the floor is released. When the seat back is tilted forward, the first link is moved together with the seat back in a direction to be separated from the second link, that is, in a direction opposite to a direction in which the first link turns the second link.

With the first aspect, the first link operated by the operating member is provided for the seat back, so the rotational position (direction) of the first link with respect to the second link is changed as the seat back is tilted forward. Here, when the seat back is tilted forward, the first link is moved together with the seat back in a direction to be separated from the second link, that is, in a direction opposite to a direction in which the first link turns the second link. Therefore, when the seat back is tilted forward, it is not configured so that the first link is rotated in a direction to further turn the second link and then the arrangement of both links is inverted, but it is configured so that the first link moves in a direction to be separated from the second link. Therefore, it is possible to obtain the configuration with no inverted arrangement of both links without an increase in size and complexity of the configuration of both links.

In the above first aspect, the first link may have a press arm that turns the second link. When the operating member is operated, the press arm of the first link may be pivoted forward in a downward rotation to turn the second link forward. When the seat back is tilted forward, the press arm of the first link may rotate rearward together with the seat back in a downward rotation around a rotation center of the seat back.

Then, when the first link is operated by the operating member, the press arm is rotated forward in a downward rotation to turn the second link forward. Then, when the seat back is tilted forward, the press arm of the first link rotates rearward together with the seat back in a downward rotation around a rotation center of the seat back. Therefore, it is possible to implement a configuration that the first link is moved in a direction to be separated from the second link, that is, in a direction opposite to a direction in which the first link turns the second link, as the seat back is tilted forward.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5A is a side view that illustrates a seating position of the vehicle seat;

FIG. 5B is a partially enlarged view of FIG. 5A;

FIG. 6A is a side view that illustrates the retracted position of the vehicle seat;

FIG. 6B is a partially enlarged view of FIG. 6A;

DETAILED DESCRIPTION OF EMBODIMENTS

Hereinafter, an embodiment of the invention will be described with reference to the accompanying drawings.

Figure 1:
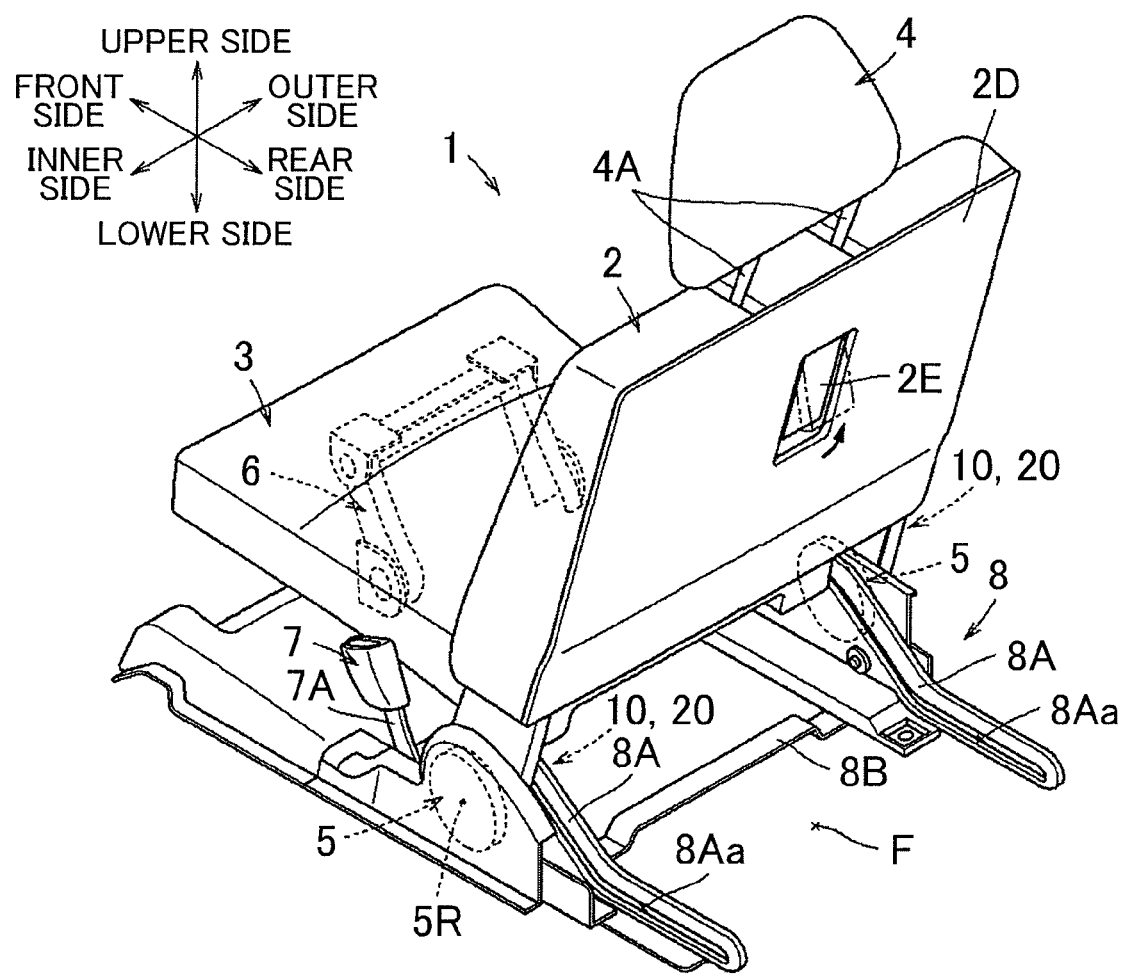
FIG. 1 is a perspective view that illustrates a seating position of a vehicle seat according to a first embodiment when viewed from its rear side.

The configuration of a vehicle seat 1 according to a first embodiment will be described with reference to FIG. 1 through FIG. 10. Here, FIG. 1 shows the configuration of the vehicle seat 1 according to the present embodiment. The vehicle seat 1 may be provided in the rearmost row in a vehicle equipped with three seat rows. The vehicle seat 1 includes a seat back 2, a seat cushion 3 and a headrest 4. The seat back 2 serves as a backrest for a seated occupant. The seat cushion 3 serves as a seating portion. The headrest 4 supports the head of a seated occupant.

More specifically, the vehicle seat 1 may be one of two seats provided in the third seat row, and is arranged at the right side when viewed from the rear side of the vehicle. Then, a side rim that constitutes a vehicle body side wall (not shown) is attached next to an outer side portion of the seat on the right side in the drawing, and the other seat of the third seat row is arranged next to an inner side portion of the seat on the left side in the drawing.

Furthermore, in the vehicle seat 1, the seat back 2 and the seat cushion 3 each are coupled to and supported by a base frame 8 that is fixed to the floor F of the vehicle, and the headrest 4 is coupled to and supported by the upper portion of the seat back 2. More specifically, the lower ends of the right and left sides of the seat back 2 are coupled to the base frame 8 via a disk-shaped reclining device 5. Each disc-shaped reclining device 5 functions as a rotary shaft device that locks and releases rotation of the shaft.

Figure 3:
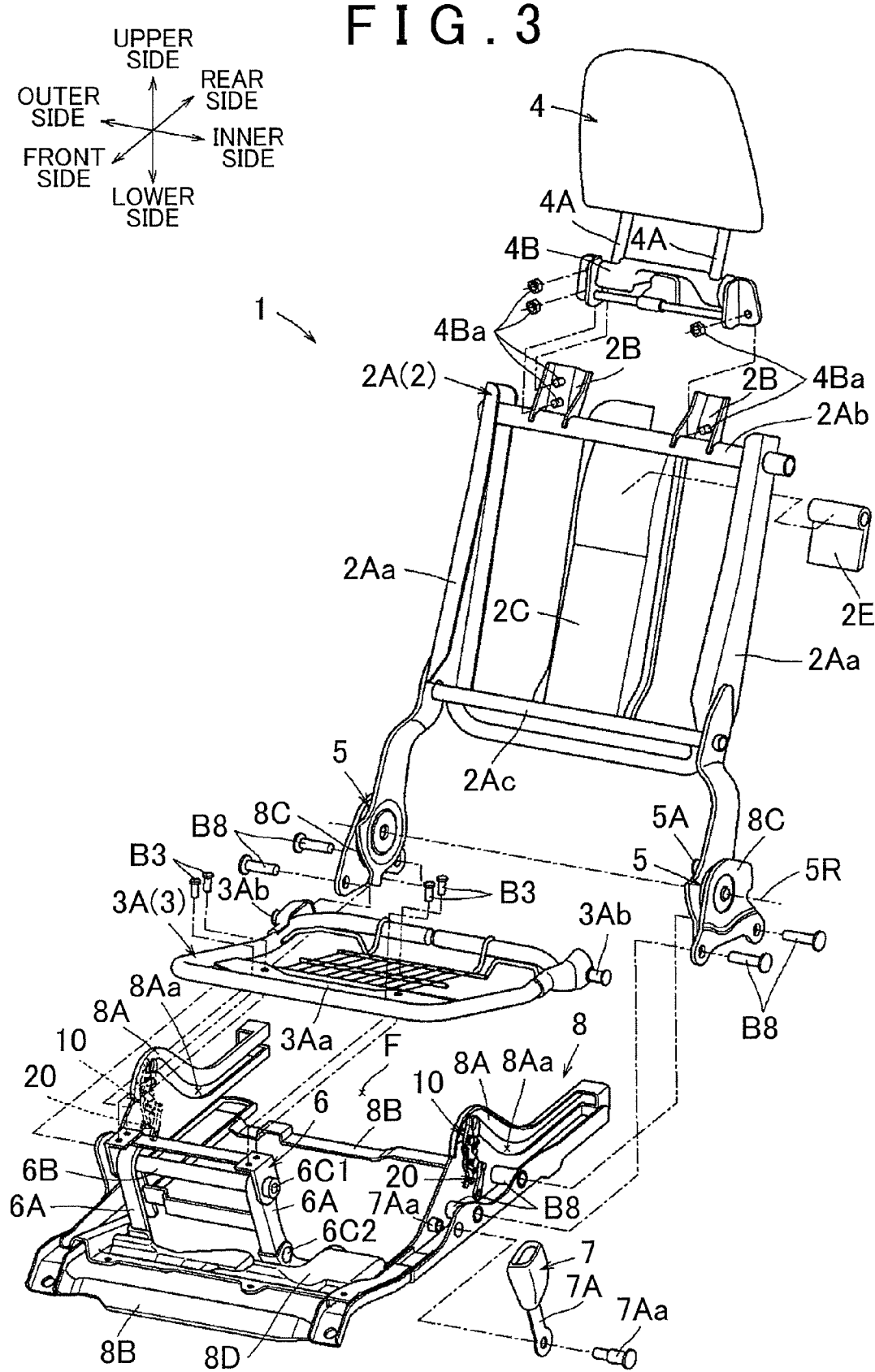
FIG. 3 is an exploded perspective view that illustrates the framework structure inside the vehicle seat.
Figure 4:
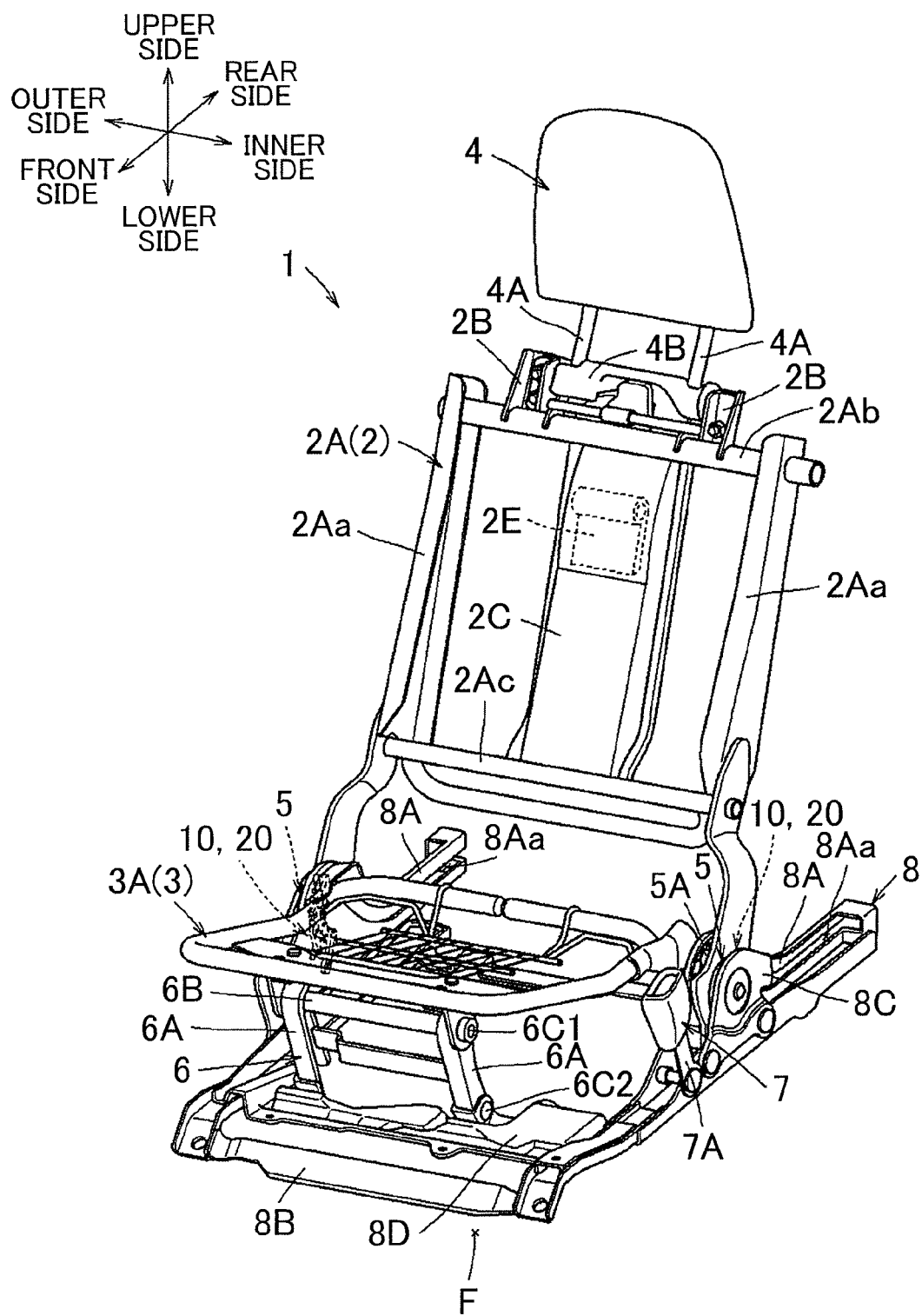
FIG. 4 is a perspective view that illustrates the assembled framework structure shown in FIG. 3.

Here, as shown in FIG. 3 and FIG. 4, the base frame 8 is formed from right and left base plates 8A that extend in the longitudinal direction of the vehicle. Each base plate 8A is fastened to the floor F using fasteners, such as bolts and nuts (not shown). Moreover, the respective front portions of the pair of base plates 8A are integrally coupled to each other by a narrow horizontally long tie plate 8B, and the respective rear portions of the pair of base plates 8A are integrally coupled to each other by another tie plate 8B. Note that each tie plate 8B is also fastened to the floor F by using bolts and nuts (not shown).

A back frame 2A forms the framework of the seat back 2. The back frame 2A includes right and left side frame members 2Aa, an upper pipe 2Ab and a lower pipe 2Ac, which are assembled into a rectangular shape. The frame members 2Aa may be made from a steel plate and each extends in the longitudinal direction of the seat back 2. The upper pipe 2Ab is made of a steel pipe that is integrally coupled to the upper end of each side frame members 2Aa. The lower pipe 2Ac is also made of a steel pipe and that is integrally coupled to the lower end of each side frame members 2Aa. Then, the lower ends of the right and left side frame members 2Aa are respectively coupled to the right and left base plates 8A via the reclining devices 5.

More specifically, the side frame members 2Aa of the seat back 2 are respectively coupled to brackets 8C, which are fixed to the corresponding base plates 8A of the base frame 8. Each bracket 8C is fastened to a corresponding base plate 8A by fasteners B8, such as. In addition, a support plate 7A of a seat belt buckle 7 is fastened to the inner base plate 8A, shown on the right side in the drawing, by a fastener 7Aa, such as. The seat belt buckle 7 serves as a belt buckling portion of a seat belt device (not shown).

In addition, in the headrest 4, a hinge bracket 4B that has a hinge is integrally coupled to the lower end portions of two columnar stays 4A that serve as support columns, and the hinge bracket 4B is fastened to brackets 2B that are coupled to the upper pipe 2Ab of the back frame 2A by fasteners 4Ba. Thus, the headrest 4 is coupled to the upper portion of the seat back 2.

Figure 2:
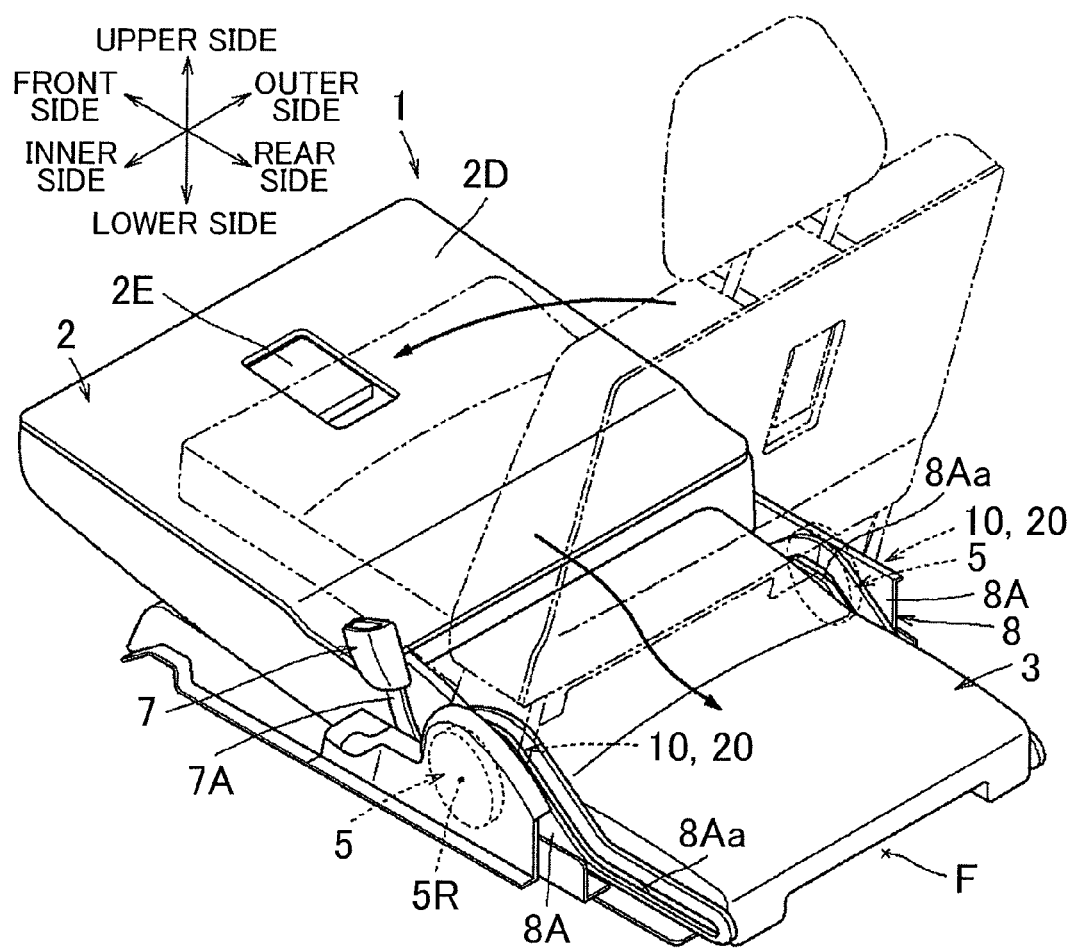
FIG. 2 is a perspective view that illustrates a retracted position of the vehicle seat.

The rotation at the hinge of the hinge bracket 4B is normally locked, so the headrest 4 is held at a position where the body that supports the head of an occupant protrudes upward from the seat back 2. However, the hinge bracket 4B may be released to rotate by pulling up an operating lever 2E provided in the back face of the seat back 2, and the body of the headrest 4 is tilted forward around a hinge shaft (not shown) of the hinge bracket 4B together with the stays 4A. Thus, the headrest 4 folds toward the front face of the seat back 2 (see FIG. 2). The operating lever 2E may serve as an operating member according to the aspect of the invention.

A mechanism for releasing the hinge bracket 4B through operation of the operating lever 2E shown in FIG. 3 and FIG. 4 is fixed to a steel plate center bracket 2C that spans between the upper pipe 2Ab and lower pipe 2Ac of the back frame 2A; however, the mechanism is not shown in the drawing. In addition, the operating lever 2E is connected to the back face of the center bracket 2C by a hinge member.

The inner reclining device 5 shown on the right side of the drawing has a rotation stop function, and the outer reclining device 5 has no rotation stop function. The inner reclining device 5 is normally held in a rotation-stopped state. As shown in FIG. 1, if the operating lever 2E provided at the back face of the seat back 2a is pulled up, a release lever 5A, coupled to the inner reclining device 5, is operated to thereby release the rotation-stopped state of the inner reclining device 5.

A mechanism that operating lever 2E releases the release lever 5A of the inner reclining device 5 is formed of a cable pulling structure; however, the cable pulling structure is not shown in the drawing in the present embodiment. Thus, with the above configuration, the seat back 2 is normally locked by the inner reclining device 5 in an upright position that allows a seated occupant to use the seat back 2 as a backrest. In addition, when the operating lever 2E is pulled up to release the rotation-stopped state of the seat back 2, the seat back 2 is shifted into a state where the seat back 2 may be tilted forward around a rotation center 5R at a coaxial line set for both reclining devices 5.

Here, an urging spring (not shown) is hooked between the seat back 2 and the base frame 8. The urging spring normally urges the seat back 2 to tilt forward. By so doing, the rotation-stopped state of the seat back 2 may be released by pulling up the operating lever 2E to thereby fold the seat back 2 forward by the urging force of the urging spring (not shown) to a position at which the seat back 2 is parallel to the floor F (see FIG. 2).

Next, referring back to FIG. 3 and FIG. 4, the configuration of the seat cushion 3 will be described. A cushion frame 3A forms the framework of the seat cushion 3. The cushion frame 3A is formed of steel pipes assembled into a rectangular shape. Then, in the seat cushion 3, both side portions of the front end of the cushion frame 3A are rotatably linked to the base frame 8 via a front link 6.

Here, the front link 6 is formed so that right and left long plate-like link members 6A are coupled to each other by a rod 6B. Then, hinge portions 6C1, formed at the upper end portions of each link member 6A, are respectively fastened to fitting portions 3Aa formed at the front end of the cushion frame 3A by fasteners B3 formed of bolts and nuts. Thus, the front link 6 is coupled to the cushion frame 3A so as to be rotatable around the hinge portions 6C1.

In addition, hinge portions 6C2 are formed at the lower end of each link member 6A, and each hinge portions 6C2 are fastened to a support bracket 8D by bolts and nuts (not shown). The support bracket 8D spans between the two base plates 8A of the base frame 8. Thus, the front link 6 is rotatably coupled to the base frame 8 around the hinge portions 6C2.

The support bracket 8D may be formed of a horizontally long plate member, and the right and left ends of the support bracket 8D are fixed to the corresponding base plates 8A. Note that the support bracket 8D itself is also fastened to the floor F by bolts and nuts (not shown). Slide pins 3Ab are respectively provided at both side portions of the rear end of the cushion frame 3A of the seat cushion 3. The slide pins 3Ab protrude toward opposite outer sides of the cushion frame 3A.

The slide pins 3Ab are inserted through respective rail holes 8Aa. The rail holes 8Aa are extend in the front-rear direction of the vehicle seat 1, and are formed in each base plates 8A. The slide pins 3Ab are fitted to the corresponding base plates 8A so as to be slidable in the front-rear direction along the shapes of the rail holes 8Aa. As shown in FIG. 5A to FIG. 6B, the slide pins 3Ab slide forward within the respective rail holes 8Aa when the front link 6 is tilted forward around the lower end hinge portions 6C2, and slide rearward when the front link 6 is tilted backward.

As shown in FIG. 5A and FIG. 5B, forward rotation of the front link 6 is stopped at a position at which the slide pins 3Ab come into contact with the front end portions of the rail holes 8Aa to be locked. At the rotation-stopped position, the seat cushion 3 is maintained in a normal seating position, in which the seat cushion 3 is used for seating during normal times. More specifically, in order to maintain the seat cushion 3 in the normal seating position, cushion lock devices 10 lock each slide pin 3Ab in position.

The cushion lock devices 10 are pressed as the corresponding slide pins 3Ab move to forward in the rail holes 8Aa to actuate a lock, and remain locked at the front ends of the corresponding rail holes 8Aa. Then, when the operating lever 2E provided at the back face of the seat back 2 is pulled up, the cushion lock devices 10 are released whereby the slide pins 3Ab are also released.

Each slide pin 3Ab is then free to slide rearward in the corresponding rail hole 8Aa when the front link 6 is tilted rearward, as shown in FIG. 6A and FIG. 6B. Here, the front end of each rail hole 8Aa is located higher in the height direction of the vehicle than that of the rear end of each rail hole 8Aa. Each rail hole 8Aa may be formed to incline downward from the front end toward the rear end.

Thus, the seat cushion 3 is configured to smoothly move rearward as the slide pins 3Ab smoothly slide rearward on the inclined surfaces of the corresponding rail holes 8Aa when the front link 6 is tilted rearward. In addition, an urging spring (not shown) is hooked between the seat cushion 3 and the base frame 8. The urging spring normally urges the seat cushion 3 rearward.

When the locked slide pins 3Ab are released by pulling up the operating lever 2E as described above, the seat cushion 3 is moved toward the rear of the vehicle (see FIG. 6A and FIG. 6B) by the urging force of the urging spring (not shown). Then, the seat back 2 is tilted into the area where the seat cushion 3 was before being moved rearward, the seat back 2 and the seat cushion 3 are shifted into a retracted position in which the seat back 2 and the seat cushion 3 are arranged in line in the vehicle longitudinal direction, whereby the seat back 2 is laid flush with the seat cushion 3 on the floor F.

Here, a hard resin box-shaped accommodating cover C is provided on the rear side of the vehicle seat 1 on the floor F. When the seat cushion 3 is moved rearward, the accommodating cover C accommodates the seat cushion 3 in an inner space between the accommodating cover C and the floor F. As shown in FIG. 6A and FIG. 6B, the top face of the accommodating cover C is hard so as to be useable as a mounting surface of a baggage rack and is formed in a flat shape that is flush with the back face of the seat back 2 when the seat back 2 is tilted forward to the retracted position.

In addition, a lid cover Ca is rotatably hinged to the accommodating cover C. The lid cover Ca leans on the back face of the seat back 2, and is tilted downward to cover the back face adjacent to a rotation center 5R of the seat back 2 when the seat back 2 is tilted forward to the retracted position. The lid cover Ca is always urged for rotation by the urging force of an urging spring (not shown) hooked between the lid cover Ca and the accommodating cover C in a direction to contact the back face of the seat back 2, and rotates following the tilting of the seat back 2.

By so doing, when the seat back 2 is tilted forward to the retracted position, no gap is formed between the back face of the seat back 2 and the top face of the accommodating cover C owing to the lid cover Ca, and a continuous flush face is formed. Here, the entire back face of the seat back 2 is covered with a hard back board 2D made of a plate-like member. By so doing, the back face of the seat back 2 may be used as a mounting face of a baggage rack, or the like, as well as the top face of the accommodating cover C.

Hereinafter, a mechanism for releasing the slide lock states of the respective slide pins 3Ab of the seat cushion 3 by operating the operating lever 2E provided at the back face of the seat back 2 will be described in detail. First, the configuration of the cushion lock devices 10 that lock the sliding of the respective slide pins 3Ab of the seat cushion 3 will be described with reference to FIG. 5A to FIG. 6B. As shown in FIG. 5A and FIG. 5B, each of the cushion lock devices 10 has a latch 11, a pawl 12, a connection plate 13 and torsion springs 14A and 14B. The latch 11 engages the slide pin 3Ab. The pawl 12 stops the rotation of the latch 11. The connection plate 13 reinforces the pawl 12 when the latch 11 is stopped by the pawl 12. The torsion springs 14A and 14B respectively urge the latch 11 and the pawl 12 for rotation.

The latch 11 is rotatably coupled to a corresponding one of the base plates 8A via a pivot shaft 11A, and is normally urged for rotation in a clockwise direction in the drawing by the urging force of the torsion spring 14A hooked between the latch 11 and the base plate 8A. By so doing, as shown in FIG. 6A and FIG. 6B, during normal times before the latch 11 engages the slide pin 3Ab, the latch 11 is held in a rotation stopped state in a position such that an edge portion 11E formed at the outer peripheral portion of the latch 11 is in contact with a stopper 13A formed in the connection plate 13.

At this time, the latch 11 is held in a position such that a lower jaw portion 11B that protrudes at the outer peripheral portion of the latch 11 like a fin is exposed to the inside of the rail hole 8Aa. Then, in this state, when the slide pin 3Ab slides toward the front end portion of the rail hole 8Aa, the lower jaw portion 11B is pressed by the slide pin 3Ab to rotate in a counterclockwise direction in the drawing and then an upper jaw portion 11C that protrudes at the outer peripheral portion of the latch 11 like a fin is rotated toward the back side of the slide pin 3Ab. By so doing, the rotation of the latch 11 is stopped by the pawl 12 and is locked (see FIG. 5A and FIG. 5B).

Then, the pawl 12 is rotatably coupled to a corresponding one of the base plates 8A via a pivot shaft 12A, and is normally urged for rotation in a counterclockwise direction in the drawing by the urging force of the torsion spring 14B hooked between the pawl 12 and the connection plate 13. By so doing, as shown in FIG. 6A and FIG. 6B, during normal times before the latch 11 engages the slide pin 3Ab, the pawl 12 is held in a rotation stopped state in a position such that an engaging surface 12B facing in a rotation direction (urged direction) of the pawl 12 is brought into contact with an engaging shaft 11D that is provided for the latch 11 so as to protrude in the axial direction.

Then, in this state, when the slide pin 3Ab slides toward the front end portion of the rail hole 8Aa to turn the lower jaw portion 11B of the latch 11 in the counterclockwise direction in the drawing, the engaging shaft 11D of the latch 11 is disengaged from the engaging surface 12B of the pawl 12, and then the pawl 12 is urged to rotate in the counterclockwise direction in the drawing. By so doing, as shown in FIG. 5A and FIG. 5B, the engaging shaft 11D of the latch 11 climbs onto a run-on surface 12C curved in a circular arc shape at the outer peripheral portion of the pawl 12, and the rotation of the latch 11 in the clockwise direction in the drawing is restricted. Thus, the sliding of the slide pin 3Ab is locked.

In addition, the connection plate 13 is coupled to the latch 11 and the pawl 12 so that the connection plate 13 is bridged between the pivot shaft 11A of the latch 11 and the pivot shaft 12A of the pawl 12. When the rotation of the latch 11 is stopped by the pawl 12, the connection plate 13 functions as a reinforcement member to withstand repulsive force applied between the latch 11 and the pawl 12 when the run-on surface 12C of the pawl 12 presses the engaging shaft 11D of the latch 11 in a rotation direction against the urging force in order to lock the rotation of the pawl 12 with no rattle.

Incidentally, as shown in FIG. 5A and FIG. 5B, the slide lock state of each cushion lock device 10 is released in such a manner that a release link 20 rotatably coupled to the base plate 8A is rotated in the counterclockwise direction in the drawing to turn a leg arm 12D of the pawl 12 in the clockwise direction in the drawing. Here, the release link 20 functions as a second link according to the aspect of the invention. Specifically, when the leg arm 12D of the pawl 12 is turned in the clockwise direction in the drawing, the run-on surface 12C of the pawl 12 is slipped off from the engaging shaft 11D of the latch 11, and the latch 11 rotates in the clockwise direction in the drawing by the urging force of the urging spring.

By so doing, as shown in FIG. 6A and FIG. 6B, the slide pin 3Ab is disengaged from the latch 11 so that the slide pin 3Ab is pushed out rearward by the lower jaw portion 11B of the latch 11. Here, the release link 20 is rotatably coupled to the base plate 8A by the pivot shaft 21. The release link 20 is assembled to the base plate 8A so that a release pin 22 that protrudes from the distal end portion of the release link 20 in the axial direction is inserted in a circular arc hole 8Ab formed through the base plate 8A.

By so doing, the release link 20 is movable for rotation with respect to the base plate 8A within a movable range in which the release pin 22 slides in the circular arc hole 8Ab. Then, the release link 20 is normally urged for rotation in the clockwise direction in the drawing by the urging force of an urging spring (not shown) hooked between the release link 20 and the base plate 8A, and is held in a rotation stopped state at a position at which the release pin 22 contacts the rear end portion of the circular arc hole 8Ab.

Figure 7:
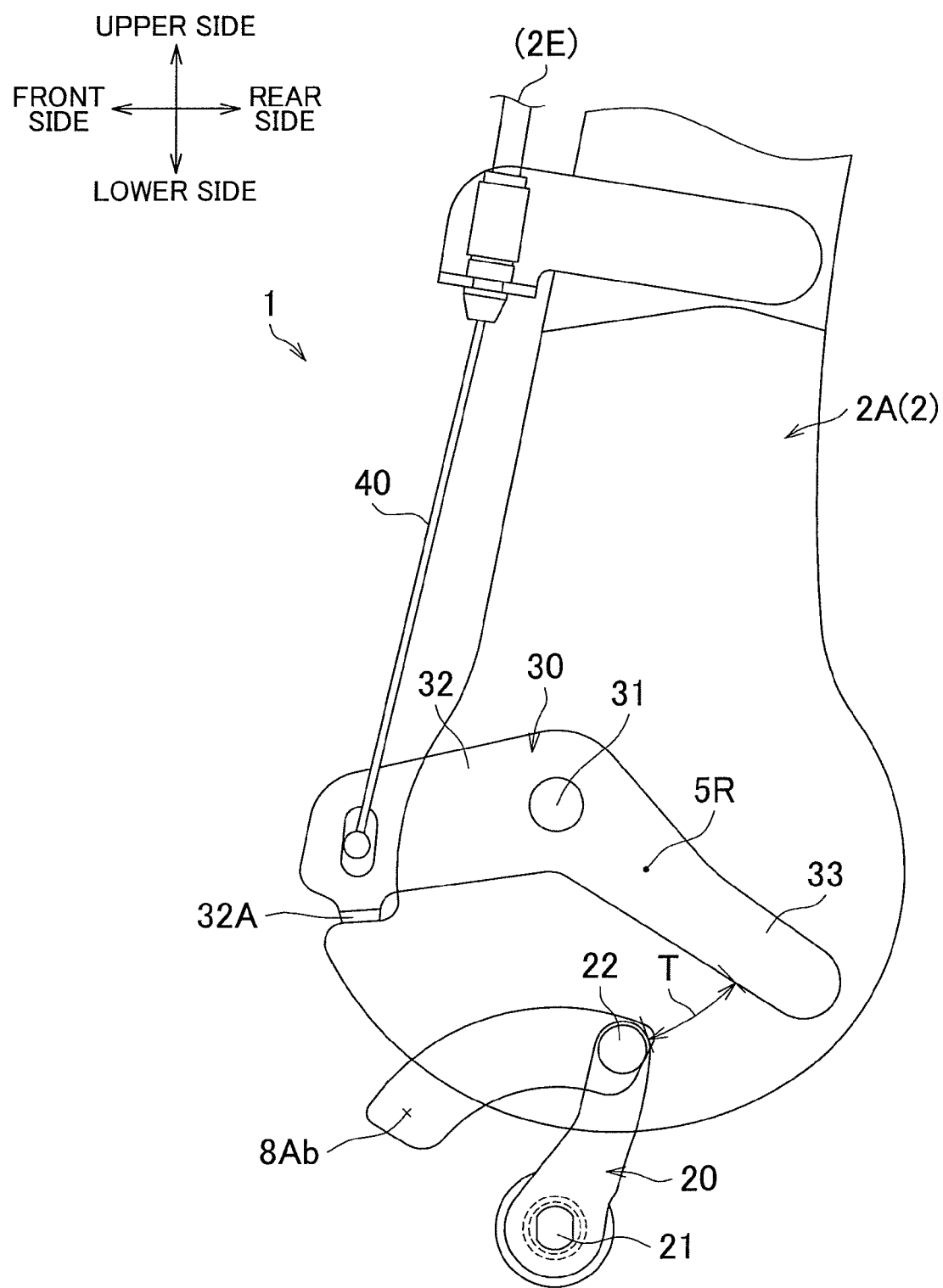
FIG. 7 is an enlarged view of a relevant portion that illustrates an initial state of a first link.
Figure 8:
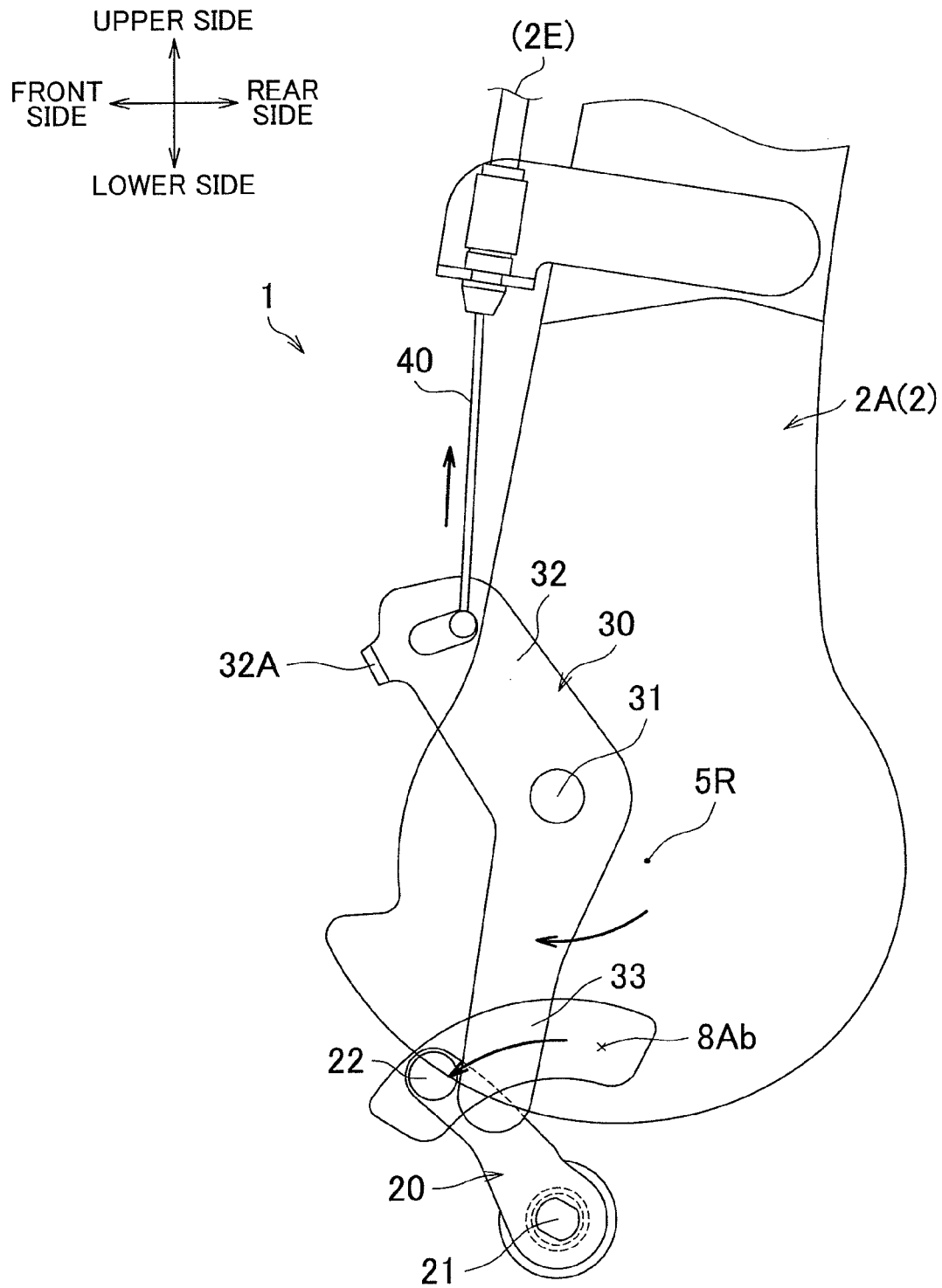
FIG. 8 is an enlarged view of a relevant portion that illustrates a state where the first link is rotated by operating an operating lever.

Then, when the release link 20 is rotated in the counterclockwise direction in the drawing by the following operation, the release pin 22 turns the leg arm 12D of the pawl 12 to thereby release the slide lock state of the cushion lock device 10. Specifically, as shown in FIG. 7 and FIG. 8, the release link 20 is rotated in the counterclockwise direction in the drawing by an operating link 30 that is rotated by pulling up the operating lever 2E (see FIG. 1). The operating link 30 is provided on the seat back 2.

Here, the operating link 30 functions as a first link according to the aspect of the invention. The operating link 30 is formed in a dogleg shape, and a joint at the bent portion is rotatably coupled to the side frame 2Aa of the seat back 2 by a pivot shaft 31. The operating link 30 is normally urged for rotation in the counterclockwise direction in the drawing by the urging force of an urging spring (not shown) hooked between the operating link 30 and the seat back 2. The operating link 30 is held in a rotation stopped state at a position at which an engaging piece 32A formed by bending an operating arm 32 that forms one of the arms of the dogleg shape contacts the side frame 2Aa.

Then, the operating link 30 is rotated in the clockwise direction in the drawing in such a manner that an operating cable 40 connected to the operating arm 32 is drawn by pulling up the operating lever 2E (see FIG. 1). By so doing, as shown in FIG. 8, a press arm 33 that forms the other one of the arms of the dogleg shape of the operating link 30 presses the release pin 22 of the release link 20 to turn the release link 20 in the counterclockwise direction in the drawing (forward direction).

Then, by so doing, the slide lock of each slide pin 3Ab is released by a corresponding one of the cushion lock devices 10 shown in FIG. 5A to FIG. 6B, and then the seat cushion 3 moves toward the rear of the vehicle, that is, in a retracting direction. In addition, together with this, as shown in FIG. 3 and FIG. 4, the rotation stopped state of the reclining device 5 is released by pulling up the operating lever 2E, so the seat back 2 is tilted forward into room that is made with rearward movement of the seat cushion 3 to be shifted into a retracted position.

Figure 9:
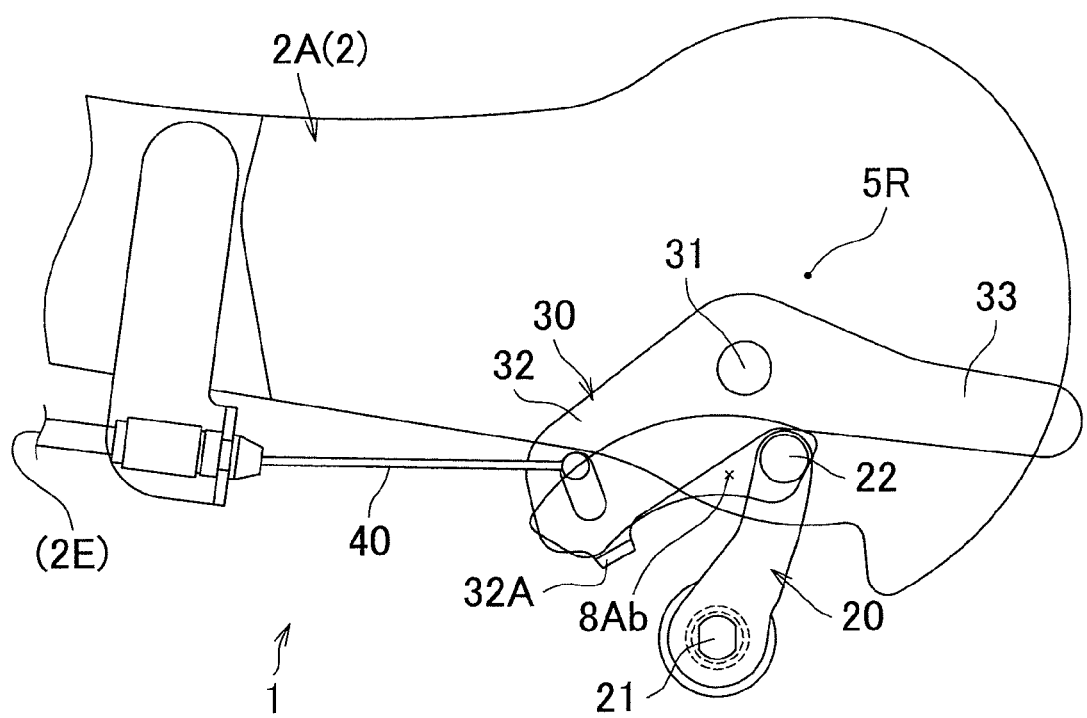
FIG. 9 is an enlarged view of a relevant portion that illustrates a state where a seat back is tilted forward to change the rotational position (direction) of the first link.

At this time, as shown in FIG. 9, the operating link 30 provided for the seat back 2 is tilted forward together with the seat back 2 around the rotation center 5R of the reclining device 5 as the seat back 2 is tilted forward. By so doing, the operating link 30 is separated rearward from the release pin 22 in such a manner that the press arm 33 moves rearward, that is, a direction opposite to the direction in which the press arm 3 turns the release pin 22 of the release link 20 as the seat back 2 is tilted forward.

More specifically, as shown in FIG. 8, when the operating lever 2E is fully pulled up to turn the release pin 22 of the release link 20 to thereby place the cushion lock device 10 in the released state (see FIG. 6A and FIG. 6B), the press arm 33 of the operating link 30 maintains a state of being in contact with the release pin 22, that is, a state of pressing the release pin 22 from the rear side. Then, in this state, when the seat back 2 is tilted forward, the press arm 33 rotates around the rotation center 5R together with the seat back 2.

By so doing, the press arm 33 does not press the release pin 22 further forward but is moved in a direction to be separated rearward from the release pin 22. That is, the press arm 33 is separated rearward from the release pin 22, so the arrangement that the press arm 33 is located rearward of the release pin 22 is maintained. In this way, in the configuration according to the present embodiment, the operating link 30 is provided for the seat back 2, and changes its rotation direction with respect to the release link 20 as the seat back 2 is tilted forward.

In this way, when the seat back 2 is tilted forward, the operating link 30 moves together with the seat back 2 in a separating direction opposite to the direction in which the operating link 30 turns the release link 20. In other words, when the seat back 2 is tilted forward, it is not configured so that the operating link 30 is rotated in a direction to further turn the release link 20 and then the front-rear arrangement of both links 20 and 30 is inverted, but it is configured so that the operating link 30 moves in a direction to be separated from the release link 20. Therefore, it is possible to obtain the configuration with no inverted arrangement of both links 20 and 30 without an increase in size and complexity of the configuration of both links.

Figure 10:
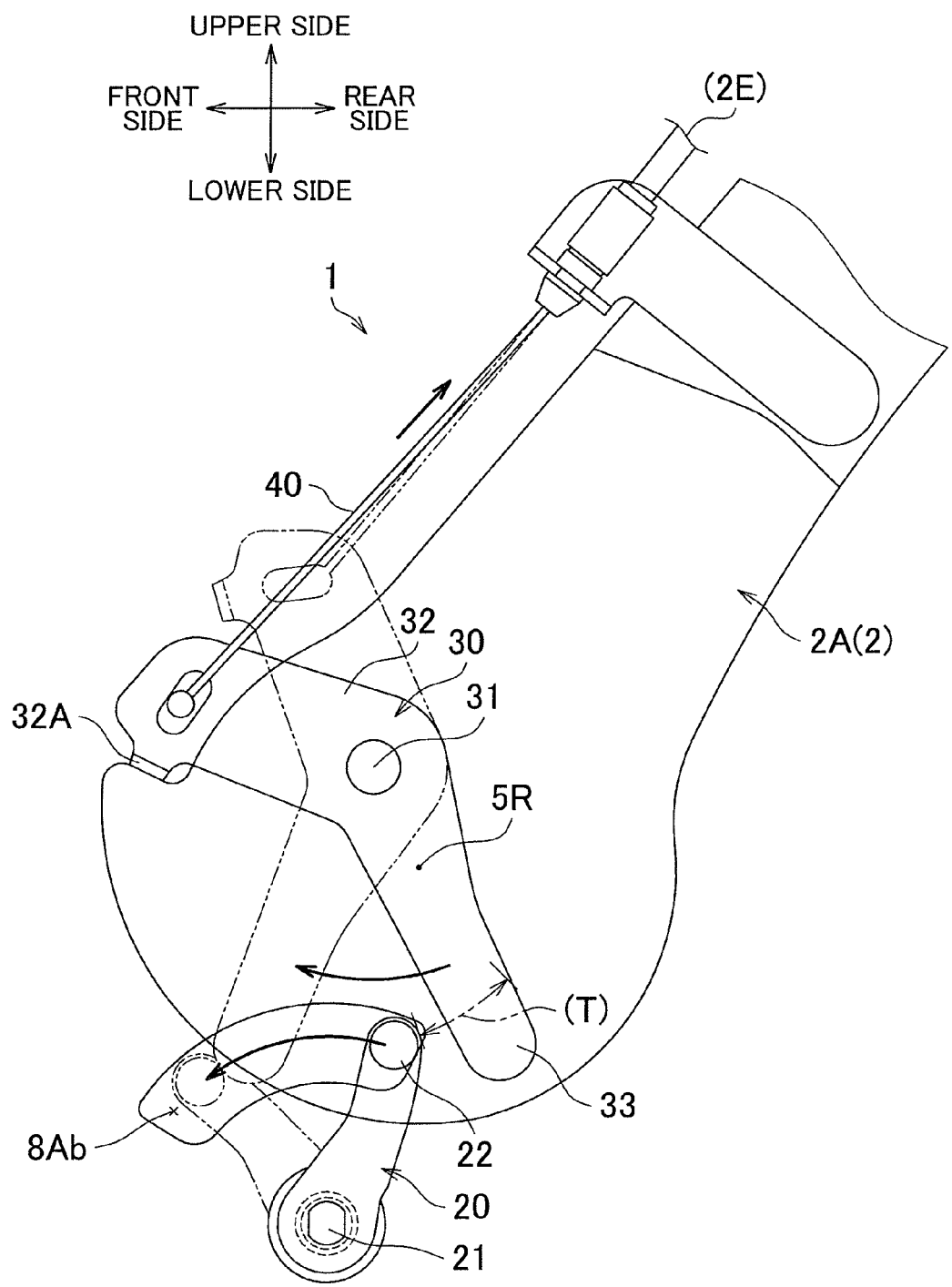
FIG. 10 is an enlarged view of a relevant portion that illustrates the arrangement of both links when the seat back may be reclined rearward.

In addition, as shown in FIG. 7, when the seat back 2 is held in an upright position so as to be useable as a back rest, the operating link 30 ensures a certain gap T in a front-rear direction (rotation direction) from the release pin 22 of the release link 20. Thus, for example, as shown in FIG. 10, in a case where the seat back 2 is configured to be able to adjust its back rest angle in a backward tilting direction, even when the press arm 33 of the operating link 30 is moved as the seat back 2 is tilted rearward, a forward displacement of the press arm 33 does not exceed the gap T between the press arm 33 and the release pin 22 thereby not to press the release pin 22 forward.

In addition, even when the operating lever 2E (see FIG. 1) is fully pulled up in a state where the seat back 2 is tilted rearward by a certain amount to rotate the operating link 30 in the clockwise direction in the drawing, the arrangement that the press arm 33 is located rearward of the release pin 22 is maintained. Thus, in this state, when the seat back 2 is tilted forward, the press arm 33 is moved rearward to be separated from the release pin 22 as in the case of the above.

The aspect of the invention is described using one embodiment; however, the aspect of the invention may be modified into various forms other than the above described embodiment. For example, the cushion lock device 10 that locks the sliding of the slide pin 3Ab of the seat cushion 3 with respect to the base frame 8 is described as a locking structure for locking the seat cushion 3 to the floor F. However, the locking structure is not limited to a specific locking structure. Various locking structures that allow the locking of the seat cushion 3 to be released by a rotation displacement by which the second link is turned are applicable.

For example, an example of the locking structure is a slide lock device of a slider device that slidably couples a seat cushion to a floor, an engagement lock device that disengageably locks a seat cushion to a floor or a rotation lock mechanism that stops the rotation of a link mechanism that rotatably couples a seat cushion to a floor.

In addition, as shown in FIG. 7, in the above embodiment, the rotation center (pivot shaft 31) of the operating link 30 (first link) is set at a position forward and upward of the rotation center 5R of the seat back 2. Instead, the position of the rotation center (pivot shaft 31) of the operating link 30 may be arranged at a position that is located in the same axis as the position of the rotation center 5R of the seat back 2 or may be set at a position deviated in at least any one of forward, rearward, upward and downward directions from the rotation center 5R of the seat back 2.

What is claimed is:

1. A vehicle seat comprising:
   an operating member that is provided for a seat back, wherein the operating member is operated to release a locking of a seat cushion to a floor and to release a rotation-stopped state of a reclining device;
   a first link that is pivotally provided on the seat back; and
   a second link that is pivotally provided on one of the seat cushion and the floor,
   wherein when the operating member is operated, the first link is rotated in one rotation direction to contact the second link and turn the second link so that the locking of the seat cushion to the floor is released, and
   when the seat back is tilted in a forward direction, the first link is moved together with the seat back in a direction opposite to the one rotation direction.

2. The vehicle seat according to claim 1, wherein the first link has a press arm that contacts and turns the second link,
   when the operating member is operated, the press arm of the first link is pivoted in the one rotation direction to contact and turn the second link in the direction opposite to the one rotation direction, and
   when the seat back is tilted in the forward direction, the press arm of the first link that is pivotally provided on the seat back rotates around a rotation center of the seat back in the direction opposite to the one rotation direction and separates from the second link.

* * * * *